W. WILLIS.
SOLDERING TORCH.
APPLICATION FILED MAR. 6, 1917.
1,248,769.
Patented Dec. 4, 1917.
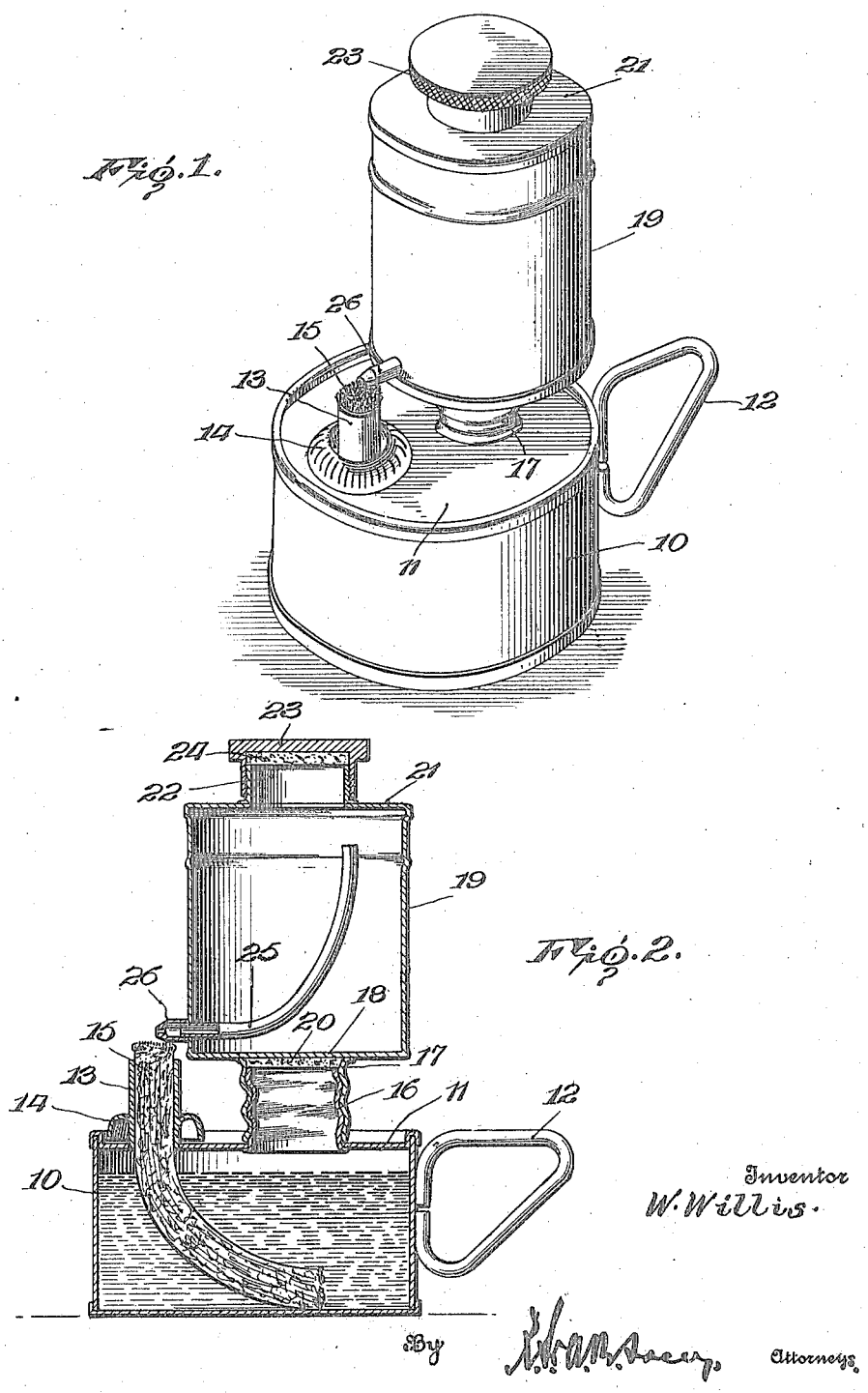
Inventor
W. Willis.
By [signature], Attorneys

UNITED STATES PATENT OFFICE.

WALTER WILLIS, OF LEAD, SOUTH DAKOTA.

SOLDERING-TORCH.

1,248,769.  Specification of Letters Patent.  Patented Dec. 4, 1917.

Application filed March 6, 1917. Serial No. 152,868.

*To all whom it may concern:*

Be it known that I, WALTER WILLIS, a citizen of the United States, residing at Lead, in the county of Lawrence and State of South Dakota, have invented certain new and useful Improvements in Soldering-Torches, of which the following is a specification.

My invention relates to new and useful improvements in soldering torches, the primary object of my invention being the provision of a soldering torch capable of utilizing alcohol as a fuel.

More specifically, one of the objects which I have in view is the provision of a soldering torch having two fuel containers, one superimposed upon the other and each having a burner, the burner of the lower container being provided with a wick disposed immediately below the burner of the upper container so that the flames of the two will mingle and the fuel supply pipe of the burner of the upper container being extended above the level of fuel in such container so that only vapor generated in the container will be fed to the burner.

Another object which I have accomplished by my present invention is the provision of the torch in such a manner that the upper container serves as a closure for the lower container.

With these and other objects in view, my invention will be more fully described, illustrated in the accompanying drawings, and then specifically pointed out in the claim which is attached to and forms a part of this application.

In the drawings:

Figure 1 is a perspective view of my improved soldering torch;

Fig. 2 is a central vertical sectional view taken through the plane of the burners.

Corresponding and like parts are referred to in the following description and indicated in all the views of the drawings by the same reference characters.

My improved soldering torch includes a lower cylindrical body or container 10 which is preferably relatively shallow and closed at its upper end by a top 11. A length of wire bent to form an eye 12 has its overlapping ends secured to the wall of the body 10 to provide a handle disposed in a vertical plane. The top wall of the container 10 is formed at a point opposite the handle with an opening to receive the threaded burner tube 13 which has a milled flange 14 by which it may be applied and removed and which projects but a slight distance above the container. A wick 15, of cotton yarn or other suitable material, projects at one end slightly through this burner tube or burner. The top wall of the lower container, at a point between the handle and burner, is formed with an opening surrounded by an upstanding threaded flange 16 which is closed by a threaded cap 17 formed integrally with or permanently secured to the bottom wall 18 of an upper container 19, a gasket 20 being located within the cap to prevent leakage from the lower container.

This upper container 19 is also cylindrical in shape but is preferably of considerably less diameter than the lower container and of greater height, being closed at its upper end by a top 21 formed with an opening surrounded by a threaded neck or spout 22 to receive a closure cap 23, a packing disk or gasket 24 being located within the cap to form an air tight closure. A tube 25 projects at one end through the upper container 19 immediately above its bottom in such a manner as to lie directly over the burner when the two containers are assembled and such projecting end of the tube is provided with a burner 26 having a very fine fuel outlet opening. The remainder of the tube within the container extends diametrically across the container, terminating at its upper end adjacent the top of the container and at the side opposite its burner carrying end.

In use, the lower container is filled with alcohol and a small quantity of alcohol is placed in the upper container, care being taken that its level is considerably below the level of the inclosed end of the pipe or tube 25. The wick is then lighted and the flame from its wick transmits heat to the upper container and particularly to the burner 26 thereof so that the alcohol within the upper container is heated sufficiently to cause it to boil. The vapor given off by this boiling alcohol is forced out through the burner 26 in the form of a fine spray and is ignited by the flame from the wick. The resultant flame from the two burners affords a very intense heat so that solder may be melted directly by the flame when the device is used as a soldering torch or a soldering iron held in the flame may be highly heated.

Although I have illustrated and described my invention in all its details of construction, it will of course be understood that I do not wish to limit myself to such details, but reserve the right to make any changes within the scope of the appended claim.

Having thus described the invention, what is claimed as new is:

A soldering torch including a fuel container, a burner tube projecting above the top of the container, a wick projecting from the tube, a filling spout projecting from the top of the container, a second container, a cap carried by the second container and adapted to engage about the filling spout to connect the containers, a burner projecting through the wall of the second container adjacent its lower end and immediately above the wick, and a tube within the second container leading from the burner to a point adjacent the upper end of the second container.

In testimony whereof I affix my signature.

WALTER WILLIS. [L. S.]

Copies of this patent may be obtained for five cents each, by addressing the "Commissioner of Patents, Washington, D. C."